United States Patent
Wirtanen

(10) Patent No.: US 10,911,981 B2
(45) Date of Patent: Feb. 2, 2021

(54) METHOD AND APPARATUS FOR ADAPTIVE NETWORK-CONGESTION HANDLING

(71) Applicant: FORD GLOBAL TECHNOLOGIES, LLC, Dearborn, MI (US)

(72) Inventor: Jeffrey William Wirtanen, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/423,405

(22) Filed: May 28, 2019

(65) Prior Publication Data

US 2020/0382989 A1 Dec. 3, 2020

(51) Int. Cl.
*H04W 28/02* (2009.01)

(52) U.S. Cl.
CPC ... *H04W 28/0289* (2013.01); *H04W 28/0247* (2013.01)

(58) Field of Classification Search
None
See application file for complete search history.

(56) References Cited

U.S. PATENT DOCUMENTS

| | | | | |
|---|---|---|---|---|
| 9,676,385 B2 * | 6/2017 | Kang | | B60W 30/00 |
| 10,536,828 B1 * | 1/2020 | Chan | | H04M 1/72533 |
| 2011/0225228 A1 * | 9/2011 | Westra | | G06F 8/60 |
| | | | | 709/203 |
| 2014/0092735 A1 | 4/2014 | Lee et al. | | |
| 2016/0142888 A1 * | 5/2016 | Moon | | H04W 4/12 |
| | | | | 455/414.1 |
| 2017/0201461 A1 * | 7/2017 | Cheng | | H04L 47/286 |
| 2018/0288814 A1 * | 10/2018 | Ayoub | | H04L 69/327 |
| 2019/0387430 A1 * | 12/2019 | Ingerman | | H04L 47/32 |

FOREIGN PATENT DOCUMENTS

WO 2017191615 A1 11/2017

* cited by examiner

*Primary Examiner* — Brian S Roberts
(74) *Attorney, Agent, or Firm* — Michael Spenner; Brooks Kushman P.C.

(57) ABSTRACT

A vehicle includes a telematics control unit and a processor that may receive a wake-up message, via the telematics control unit, from a service delivery network (SDN), requesting a response from the vehicle. The vehicle may determine, based on a rejected data call attempted as the response, that a current network cell is congested. The vehicle may additionally notify the SDN of the congestion, via a predetermined communication format indicated as being available when a cell is congested. Also, the vehicle may use the predetermined communication format for communication with the SDN until the current network cell congestion is relieved or that the vehicle has traveled out of range of the current network cell.

19 Claims, 3 Drawing Sheets

METHOD AND APPARATUS FOR ADAPTIVE NETWORK-CONGESTION HANDLING

TECHNICAL FIELD

The illustrative embodiments generally relate to methods and apparatuses for adaptive network-congestion handling.

BACKGROUND

Typical vehicles that include telematics control units (TCUs) use one or more cellular service providers to communicate with a variety of back-end services, including, for example, a service delivery network (SDN). In some vehicles, there is a single TCU, and in others there are multiple TCUs with different service providers designated for each one.

While these TCUs provide vehicles with network connectivity, the vehicles tend to suffer from the same problems that plague cellular phones, such as network congestion. For example, at a sporting event or concert, there can be tens of thousand of device calls burdening a single network cell, which can cause network congestion. With regards to phones, this often simply causes users to stop using phones, but if someone is attempting to call those users, for example, the caller may inexplicably be unable to reach the recipient. Since the caller does not know about the congestion, the caller may continue to attempt the calls to no avail.

In a similar manner, the SDN may attempt vehicle communication without being aware of the congested cell to which the vehicle is currently connected. This can cause the SDN to repeatedly attempt to communicate with the vehicle, and the vehicle may simply be unable to answer in a timely or consistent manner. Even if the SDN is using a communication service that may function despite the congestion, such as certain short message service (SMS) messages, the vehicle's typical response may be a data transmission, which may be blocked by a congested network. This would then cause the SDN to, for example, assume the vehicle was powered down and offline.

SUMMARY

In a first illustrative embodiment, a system includes a vehicle telematics control unit and a processor of the vehicle configured to receive a wake-up message, via the telematics control unit, from a service delivery network (SDN), requesting a response from the vehicle. The processor is further configured to determine, based on a rejected data call attempted as the response, that a current network cell is congested. The processor is additionally configured to notify the SDN of the congestion, via a predetermined communication format indicated as being available when a cell is congested. Also, the processor is configured to use the predetermined communication format for communication with the SDN until the current network cell congestion is relieved or that the vehicle, has traveled out of range of the current network cell.

In a second illustrative embodiment, a system includes a network processor configured to receive notification from a first vehicle, responsive to a short messaging service wake request sent to the vehicle, that a network cell to which the first vehicle is currently connected is congested. The processor is also configured to temporarily designate a predefined communication format for ongoing communication with the first vehicle based on a communication format designated as being usable when a cell is congested. The processor is further configured to determine a second vehicle which is likely connected to the congested cell based on known second vehicle characteristics and notify the second vehicle of the congested cell.

In a third illustrative embodiment, a method includes receiving a notification in a first vehicle from another vehicle or a service delivery network that a network cell, upcoming on a route, is congested. The method also includes transmitting any pending data requests, designated as low-priority requests, from the first vehicle prior to reaching a location where the first vehicle is projected to attempt connection to the congested, responsive to determining that the congested cell is a cell to which the first vehicle will attempt connection.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Cellular networks can become congested when a lot of users are attempting to access the network at once. This is commonly seen, for example, at football games, where many users are clustered in a close-area, and many users are using cellular data to obtain results of other games and statistics. Also, as venues move towards mobile ticketing, virtually every venue will have an increased level of data requests as event start times arrive.

Many cellular networks use access class parring (e.g. barring data calls) whereby a device (such as a phone or telematics control unit (TCU)) performs an access barring check (such as LTE 36.331 5.3.3.2 RRC connection establishment). Because the check is based on a random number in many instances, it merely has a probability of connecting, and if the connection attempt fails the device is forced to wait a calculated time before retrying. Not only does this often result in a connection-time delay, but connection establishment times are also not uniform under such a situation.

At the same time, a device (such as a vehicle TCU) may be able to receive text messages still, so the vehicle can receive an SMS wake up call, but may be unable to timely-respond. Meanwhile, unaware of the congestion, a back-end network may continue to send wake messages to the vehicle, and may eventually drop connections if it does not receive responsive keep alive messaging from the vehicle. This wastes power and capacity and adds to the burden on the cellular network.

Figure 1:
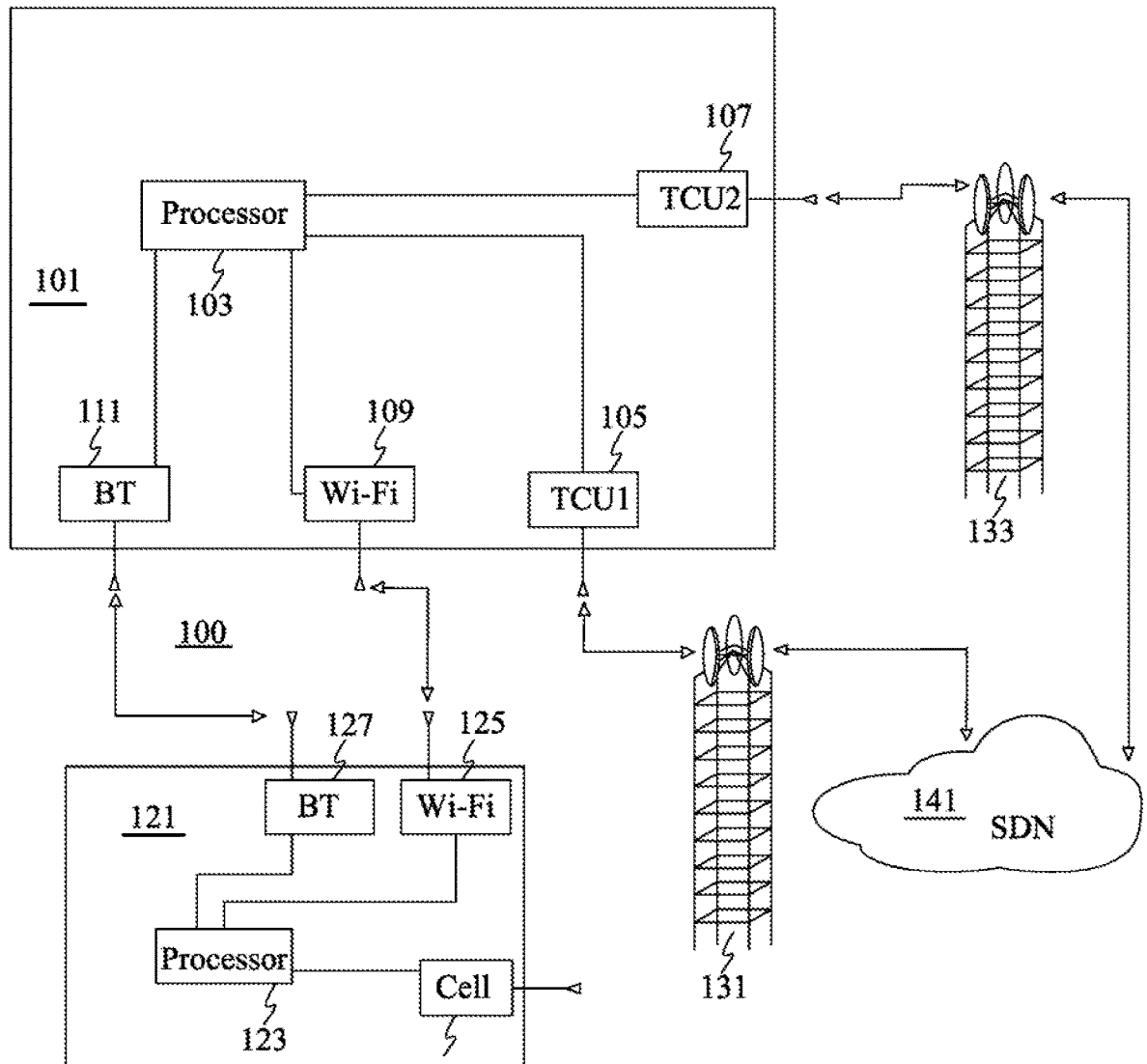
FIG. 1 shows an illustrative example of a system including a vehicle interacting with a cellular and service delivery network (SDN)

FIG. 1 shows an illustrative example of a system including a vehicle 101 interacting with a cellular 131, 133 and service delivery network (SDN) 141. In this example, vehicles 101 include onboard processors 103 that use telematics control units (TCU)s 105, 107 to communicate with cellular networks 131, 133.

The service delivery network 141 may be a back-end network that provides services to the vehicle 101. The SDN 141 may frequently interact with thousands of vehicles 101 to pass wake-messages and respond to vehicle 101 requests. Unfortunately, the SDN 141 is not always aware of congestion levels for cells 131, 133, providing telecommunications to the vehicle 101.

The SDN 141 may send a wake message to the vehicle 101 via SMS, which can pass through many congested networks to arrive at the vehicle 101. Thus, the request for the vehicle 101 to wake and respond can be delivered. At the same time, the vehicle 101 may be unable to effectively or efficiently respond to the SDN 141, because the network 131 may be congested. The vehicle 101 may repeatedly attempt to respond, but the responses may be randomly delayed or blocked on a congested network 131, and thus the SDN, unaware of the congestion, may determine the vehicle 101 is offline, or may simply continue to request wake-up from a vehicle 101 that cannot easily respond.

The vehicle 101 may be able to determine that a network is congested based on the access class barring check results and other indicators. In response to such a determination, the vehicle 101 may be able to take several remedial actions. In one instance, if the vehicle 101 has multiple TCUs 105, 107, the vehicle 101 could switch from using network 131 via TCU 105 to network 133 via TCU 107. If network 133 is not congested, this can solve the problem and the SDN 141 can be informed of the new network 133 and proceed with communication over network 133.

For certain networks, packet data network (PDN) such as LTE or PDP networks such as 2G/3G, rejections may indicate the cause (PDP) or an LTE network may have an EPS bearer context deactivation. In addition, even if a PDP or PDN is successfully activated before it is possible to send data, a RRC connection must be established and/or resumed via RRC Connection establishment (3G) or RRC connection re-establishment (LTE). Both of these procedures may be rejected via an RRCConnectionReject with a cause or a wait time (i.e. try to establish RRC connection after a timeout) that can be used to infer congestion. Similarly, if the RF conditions are poor (i.e. due to congestion) the network may not respond to RRC Connection establishment (3G) or RRC connection re-establishment (LTE) requests—this again may indicate congestion. Additionally, even if the RRC Connection Request procedure in 3G is successful, the UE must also send a Service Request to request radio access bearers (e.g. to establish a radio access bearer to transfer data), this too may be rejected via SERVICE REJECT with a cause code or timer value. These are all non-limiting examples of how network congestion can be determined.

If the second network 133 is congested as well, which is often the case at sporting events, for example, where tens of thousands of people are crowding all networks, the vehicle 101 can use SMS to respond to the SDN 141 to inform the SDN 141 that the network 131 is congested. This can cause the SDN 141 to change a wake-request approach and avoid repeated, futile wake requests. This can also cause the SDN 141 and vehicle 101 to use SMS for communication over the short term, until congestion clears or the vehicle 101 enters a less burdened cell.

Because other vehicles 101 may also be unaware of the cell congestion, the vehicle 101 can further leverage vehicle to vehicle (V2V) communication to form an ad-hoc network or relay of information to broadcast cell conditions. The vehicle 101 has onboard Wi-Fi 109 and BLUETOOTH 111 transceivers in many instances, and the vehicle 101 can use these transceivers to communicate locally with other vehicles 131, which are similarly provided with processors 123, Wi-Fi transceivers 125 and BLUETOOTH transceivers 127.

By broadcasting a congestion message, other local vehicles 121 may be configured to inform their respective SDNs 141 of the congestion, as well as to avoid repeated wake attempts that are likely to fail. As the vehicles 121 relay the message outwards, it will eventually clear the congested cell (if there is a chain of accessible V2V relays) and thus vehicles 121 entering the congestion can know about the congestion before encountering it. This may cause those vehicles 121 to send low priority data before reaching the congestion, which both helps ensure transmission of the data and reduces the likelihood of increased congestion on the already congested cell.

Figure 2:
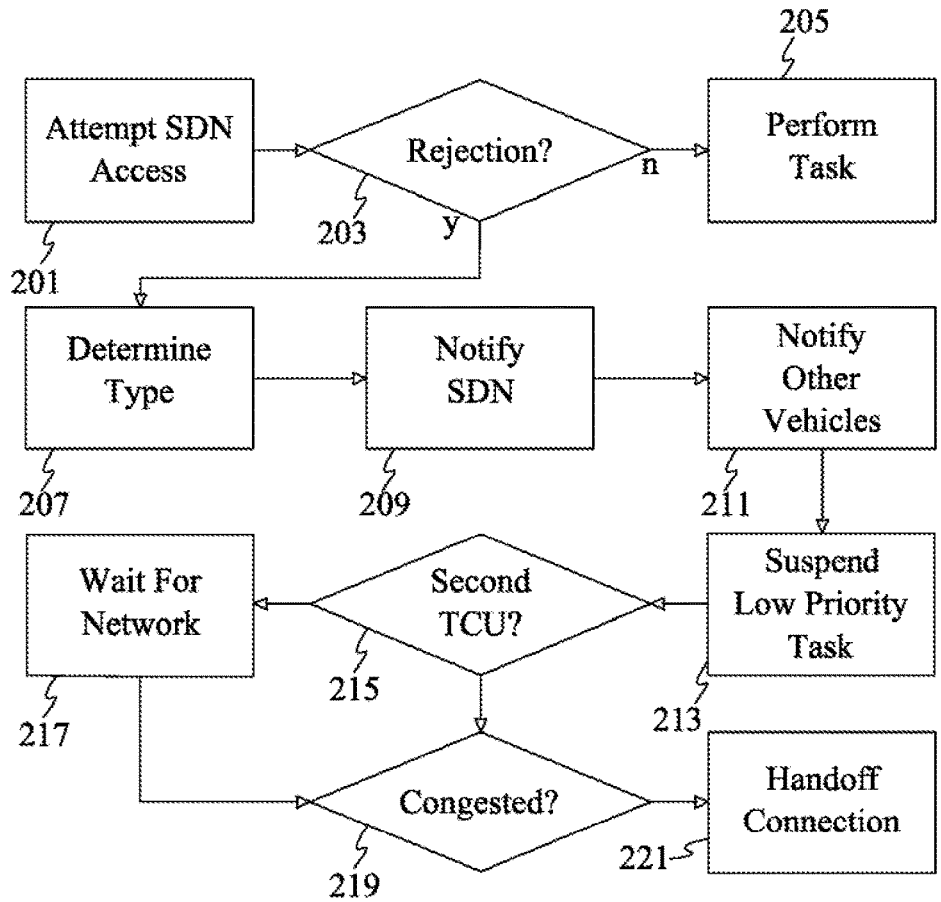
FIG. 2 shows an illustrative SDN congestion handling process.

FIG. 2 shows an illustrative SDN congestion handling process, executable by, for example, a vehicle 101 processor 103. In this example, the vehicle 101 attempts to access an SDN 141 at 201, for example, in response to a wake message from the SDN 141. If the request is not rejected at 203, the vehicle 101 will proceed with the response or request at 205.

If the request is rejected at 203, the vehicle 101 may infer that there is congestion on a first network 131, which determination may be further improved at 207 by a determination of rejection-type or reason for rejection. The vehicle 101 may then use SMS or other accessible communication unaffected or less affected by the congestion to contact the SDN 141 and notify the SDN 141 of the congestion on the cell at 209.

For example, if the vehicle 101 receives a PDP rejection, the rejection may include a reason for rejection that provides reasoning that is shareable with other entities. This can help the vehicle 101 evaluate the state of the rejecting cell, as well as provide a cause that can be shared with the SDN 141 and other vehicles 121.

Also, in this example, the vehicle 101 may use V2V communication to notify other local vehicles 121 at 211. This can be useful to notify the other vehicles 121 of the congestion, if the other vehicles 121 are unaware. Further, if those other vehicles 121 can relay the message to still further vehicles 121, the message can be effectively relayed outside the cell via a V2V ad hoc network or relay. While the SDN 141 can attempt to notify vehicles 121 outside and inside the cell of the congestion, direct delivery of the message can also be useful and may have a higher likelihood of reaching vehicles 121 to which the message is directly applicable. The potential downside is that the vehicles 121 must be in local wireless communication range of each other, to relay the message, so each notification approach can be considered for merit for a given solution.

At the time of determining the congestion, the vehicle 101 can also suspend low priority tasks at 213. This prevents attempts to access the network 131 when priority is low for a task, which can improve access time for high priority tasks, because the vehicle 101 may avoid being placed in a wait-state in response to rejected requests for the low priority tasks.

Also, in this example, the vehicle 101 determines at 215 if there is a second TCU 107 available. As data needs increase, more vehicles 101 will include multiple TCUs 105, 107. While network congestion often is a function of overcrowding of people, and thus will likely span many networks in an area, in some instances certain networks 133 may be less crowded than others 131, and the vehicle 101 may be able to use the second TCU 107 when the first TCU 105 indicates that network 131 is congested.

If there is no second TCU at 215, the vehicle 101 waits at 217 for the network to clear (via a successful call, a notification from the SDN or other vehicles 121, or a new cell). If the vehicle 101 has access to a second TCU 107 at 215, the vehicle 101 also determines at 219 if the network 133 associated with the second TCU 107 is also congested. If the second network 133 is also congested, the vehicle 101 will wait at 217 for at least one network 131, 133 to become fully or reasonably usable again.

If the second TCU 107 has access to an uncongested network 133, the vehicle 101 can handoff the connection at 221. This can include, for example, notifying the SDN 141 that the new network 133 is being used, as well as passing any pending data requests, or at least low/high priority requests to the second TCU 107. Since different networks may have different costs, which network is used for which data under this scenario may be partially a function of cost, as well as considering the impact that the transfer will have on the vehicle 101.

Figure 3:
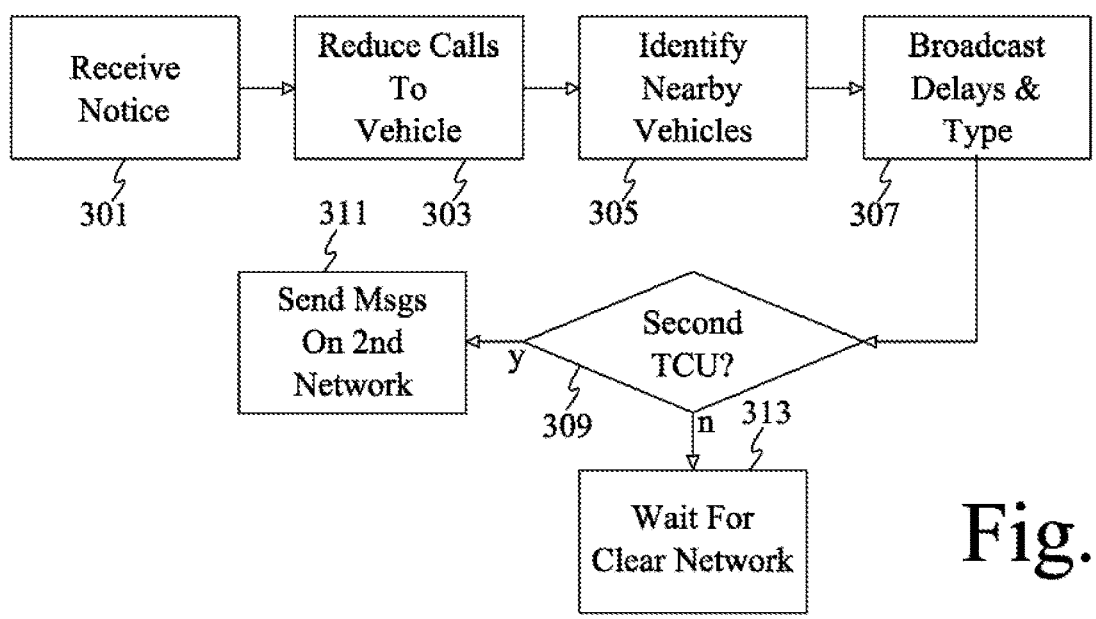
FIG. 3 shows an illustrative SDN congestion information-relay process.

FIG. 3 shows an illustrative SDN congestion information-relay process executable by, for example, the SDN 141. In this example, the SDN receives a notice at 301 from the vehicle 101 that a network 131 is congested. The notice can be in a form that is more usable during congestion, such as SMS messaging. In response to the notice, the SDN 141 can reduce wake up calls and other requests to the vehicle 101 at 303.

At the same time, the SDN 141 can reduce calls to other vehicles 101 known to use the same network 131 and be within the same cell (based on location identified at 305). The SDN 141 can also notify vehicles 121 in proximity to the reporting vehicle 101 that the network 131 is congested, via SMS messaging, for example, at 307. This can include reporting any expected delays as reported by the reporting vehicle 101, as well as reporting any received reasons for the delay at 307.

If the vehicle 101 reports that it has a second, usable TCU 107 (on an uncongested network 133) at 309, the SDN 141 can use the second network 133 for ongoing communication at 311 until the primary network 131 becomes available. The vehicle 101 can also report congestion on the second network 133, so the SDN 141 can also send congestion information to vehicles 121 using the second network 133 in a similar manner to reporting on the first network 131. If the second network 133 is congested or the vehicle 101 lacks a second TCU 107, the SDN 141 can wait for a clear network before attempting further wake messaging at 313.

Figure 4:
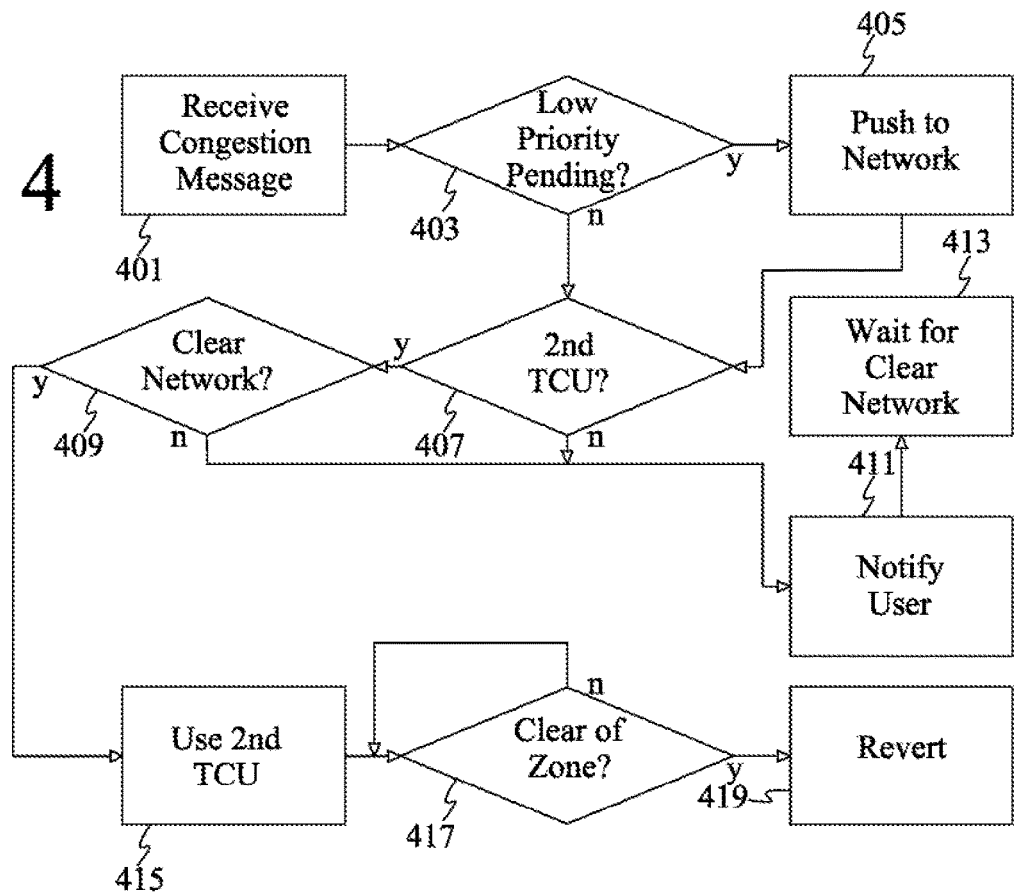
FIG. 4 shows an illustrative congestion-response process.

FIG. 4 shows an illustrative congestion-response process, executable by, for example, a vehicle 121 processor 123 that has received notification of network congestion. In this example, the vehicle 121 receives a congestion message at 401, either from another vehicle 101 via wireless communication (e.g., BLUETOOTH or Wi-Fi) or from the SDN 141 via SMS messaging.

In this example, the vehicle 121 is outside the congested cell, meaning it has an opportunity to send low priority messages before entering the congestion, which should reduce connection attempts while in the congested region. If there are low priority messages pending at 403, the vehicle 121 pushes those requests to the network 131, before entering a cell where the network 131 is congested.

Also, in this example, the vehicle 121 has an opportunity to hand-off control to a second TCU 107 if the vehicle 121 is so-equipped and if the second network 133 is not congested. If the vehicle 121 determines at 407 that it lacks a second TCU 107, the vehicle 121 may notify the user at 411 that the vehicle 121 will be entering a congested zone, and that data communication may slow. Similarly, if the vehicle 121 includes a second TCU 107, but the network 133 supporting that TCU 107 is congested, the vehicle 121 may also provide the notification at 411. Then the vehicle 121 can wait for an uncongested network at 413.

If the second network 133 is uncongested, the vehicle 121 may use the second TCU 107 at 415 to handle communication until a clear cell for the primary network 131 is reached at 417. Then, the vehicle 121 can revert to use of the primary TCU 105 and network 131 if that is so desired. The vehicle 121 may be alerted to the primary network 131 availability by reaching a new cell, by a V2V message, or by a message from the SDN 141, among other things.

Figure 5:
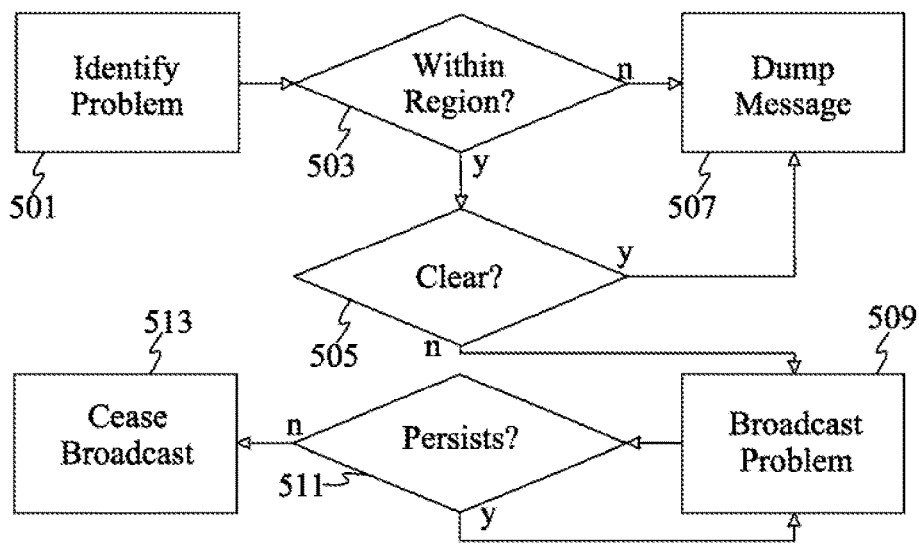
FIG. 5 shows an illustrative congestion-sharing process.

FIG. 5 shows an illustrative congestion-sharing process, executable by, for example, a vehicle 101 processor 103. In this example, the vehicle 101 identifies an existing problem with congestion at 501, either based on a rejected request or notification from another entity (SDN 141, vehicle 121, etc.). If the vehicle 101 received notification of the condition from another vehicle 121 or the SDN 141, as opposed to detecting the condition, the vehicle 101 determines if it is currently within an area associated with the congestion (e.g., associated with the congested cell) at 503. The notification message could identify the area of relevance, or the vehicle 101 may have another way of determining applicability, not limited to, but including, attempting a test data call on a current network 131.

If the vehicle 101 is not in a defined region for the congestion, if such a region exists and is identifiable from the message header, for example, the vehicle 101 will dump the message at 507. If the network 131 is uncongested (or the cell is uncongested) as evidenced by, for example, a test data call at 505, the vehicle 101 can also dump the message at 507.

On the other hand, once the vehicle 101 has identified/confirmed the problem, the vehicle 101 broadcasts the problem in V2V notification format at 509, via, for example BLUETOOTH notification or other localized wireless communication. The vehicle 101 could also notify the SDN 141, assuming the vehicle 101 did not receive notification from the SDN 141.

As long as the congestion persists at 511, the vehicle 101 continues to broadcast the message at 509. This effectively turns vehicles into carriers/beacons for congestion messages allowing for notification to other vehicles 121 to which the congestion may apply, but which have not yet received the notification. Those vehicles 121, in turn, can also become carriers of the message, allowing for rapid dissemination of information relating to the problem.

Once the congestion clears at 511, as either determined by the vehicle 101 successfully using the connection or being notified of a clear network/cell, and/or when the vehicle 101 passes out of range of the congested cell, the vehicle 101 can cease broadcasting the message at 513. If the broadcast cessation is predicated on vehicle 101 location, the vehicle 101 may continue the broadcast for a finite distance/time duration, in order to notify vehicles 121 headed to the congested cell. If the vehicle 101 has actually confirmed that the cell is now uncongested, the vehicle 101 can cease broadcast immediately at 513 since the actual problem has ceased. Cessation in this second form can result in the vehicle 101 also notifying the SDN 141 that the problem has ceased.

Determining that the cell is not congested can include, for example, a vehicle 101 scheduling periodic attempts to access the cell for a data call, in response to determining that the cell is congested.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a vehicle memory; and
a processor of the vehicle configured to
receive a wake-up message, from a service delivery network (SDN), requesting a response from the vehicle;
determine, based on a rejected data call attempted as the response, that a current network cell is congested;
notify the SDN of the congestion, via a predetermined communication format indicated as being available when a cell is congested; and
use the predetermined communication format for communication with the SDN until the current network cell congestion is relieved or that the vehicle has traveled out of range of the current network cell.

2. The system of claim 1, wherein the wake-up message is a short messaging service message.

3. The system of claim 1, wherein the determination that the cell is congested is based on access class barring for the cell.

4. The system of claim 1, wherein the determination that the cell is congested is based on receiving a PDP rejection in response to the attempted data call, the PDP rejection including a code indicating a reason for rejection.

5. The system of claim 4, wherein the notification to the SDN includes the PDP rejection code.

6. The system of claim 1, wherein the predetermined communication format includes short messaging service.

7. The system of claim 1, wherein the processor is further configured to determine that the network cell is not congested based on a scheduled attempt to use the network cell for a data call scheduled responsive to determining that the cell is congested.

8. The system of claim 1, wherein the processor is further configured to determine that the current network cell congestion is relieved based on a message from the SDN indicating the current network cell is not congested.

9. The system of claim 1, wherein the processor is further configured to determine that the current network cell congestion is relieved based on a message from another vehicle indicating the current network cell is not congested.

10. The system of claim 1, wherein the processor is further configured to use direct, wireless communication with another vehicle, to notify the other vehicle that the current network cell is congested.

11. The system of claim 10, wherein the notification includes a PDP rejection code, the congestion is determined based on a PDP rejection, and the processor of the vehicle is further configured to receive a rejection code indicating a reason for the PDP rejection.

12. The system of claim 10, wherein the direct, wireless communication includes a wireless broadcast by the vehicle and received by the other vehicle.

13. The system of claim 10, wherein the direct, wireless communication includes establishment of a BLUETOOTH connection to the other vehicle.

14. The system of claim 10, wherein the direct, wireless communication includes establishment of a Wi-Fi connection to the other vehicle.

15. A system comprising:
a network processor configured to
receive a notification from a first vehicle, responsive to a short messaging service wake request sent to the first vehicle, that a network cell to which the first vehicle is currently connected is congested;
temporarily designate a predefined communication format for ongoing communication with the first vehicle based on a communication format designated as being usable when a cell is congested;
determine a second vehicle is likely connected to the congested cell based on characteristics of the second vehicle; and
notify the second vehicle of the congested cell.

16. The system of claim 15, wherein the processor is further configured to temporarily designate the predefined communication format for ongoing communication with the second vehicle based on the communication format designated as being usable when a cell is congested.

17. The system of claim 15, wherein the processor is further configured to revert to a primary communication format from the temporarily designated communication format responsive to receiving a message from the first or second vehicle that the cell is not congested.

18. The system of claim 15, wherein the processor is further configured to notify other vehicles, for which the predefined communication format has been temporarily designated related the congested cell, that the cell is not congested, responsive to receiving a message from the first, second or any of the other vehicles that the cell is not congested.

19. The system of claim 15, wherein the processor is further configured to determine a third vehicle which is likely to connect to the congested cell based on characteristics of the third vehicle; and notify the third vehicle of the upcoming congested cell.

\* \* \* \* \*